J. W. Bookwalter,

Water Wheel.

No. 100,362.    Patented Mar. 1, 1870.

Witnesses.    J. W. Bookwalter
            Inventor.
            D. R. Holloway & Co.
            Atty.

United States Patent Office.

JOHN W. BOOKWALTER, OF SPRINGFIELD, OHIO.

Letters Patent No. 100,362, dated March 1, 1870.

IMPROVEMENT IN WATER-WHEEL CASES.

The Schedule referred to in these Letters Patent and making part of the same.

*To all whom it may concern:*

Be it known that I, JOHN W. BOOKWALTER, of Springfield, in the county of Clark, and State of Ohio, have invented a certain Improvement in Water-Wheels; and I do hereby declare that the following is a full, clear, and exact description thereof, reference being had to the annexed drawings making part of this specification, in which—

Corresponding letters denote corresponding parts in both figures.

Figure 1:
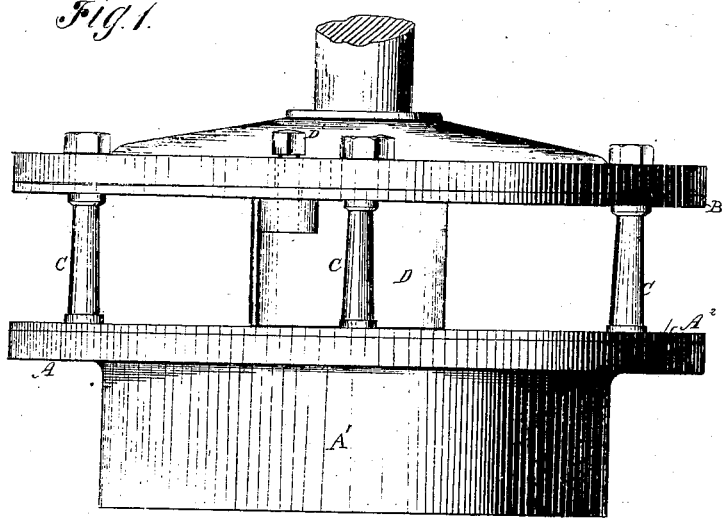
Figure 1 is an elevation of a water-wheel case, having my improvement attached thereto.

Water-wheels of this class, as heretofore constructed, have been made entirely of iron, the inner surfaces of the heads of which have been turned smooth, in order to make such surfaces parallel to each other, and so that the gates or chutes which move in the space between such heads may form water-tight joints therewith, and thus prevent leakage.

The surfaces above alluded to being constantly exposed to the action of the water, it has been found that they corrode quite rapidly, and that, as a consequence, the gates are often prevented from being moved with their usual facility, and also that they soon become leaky from the constant depreciation of the metal composing such surfaces, and are thus rendered of little or no value.

To take these heads out and reface them and fit to them a new set of gates or chutes is expensive, and is always the cause of great delay to the machinery to be driven by such wheel.

The present invention is intended to remove the objections above referred to; and to this end, It consists in lining the inner surfaces of the heads or ends of a water-wheel case with brass, copper, or some other non-corrosive metal, as will be more fully described hereinafter.

A in the drawings refers to the lower head or end of the case, it having the usual aperture in its center for the reception of the wheel proper and a cylindrical projection, $A^1$, upon its lower side which serves as a discharge-pipe for the water, or as a flange to which such pipe may be secured.

To the upper surface of this head there is to be attached by bolts or rivets, or in any suitable manner, a plate of brass, copper, or of any other non-corrosive material, the dimensions of which should be the same or about the same as those of the upper surface of the head to which it is secured.

The thickness of this plate, $A^2$, may be such as will enable it to be firmly secured to the head, say from one-eighth of an inch to any thickness desired by the constructor.

The upper surface of this plate is to be turned or otherwise smoothed after it has been secured to the head, or before, so that when placed in its proper position its upper surface shall be parallel to the under surface of the upper head.

B refers to the upper head of the case, it being of the usual or any approved form of construction, and, having in it the slots in which the stops, bolts, or pins $D^1$ move.

The under surface of this head for a portion of the distance from its periphery toward its center is parallel with the upper surface of the lower head, and for such distance it is to be covered with a non-corrosive metal plate, $B'$, in the same manner as that described for the lower head.

Figure 2:
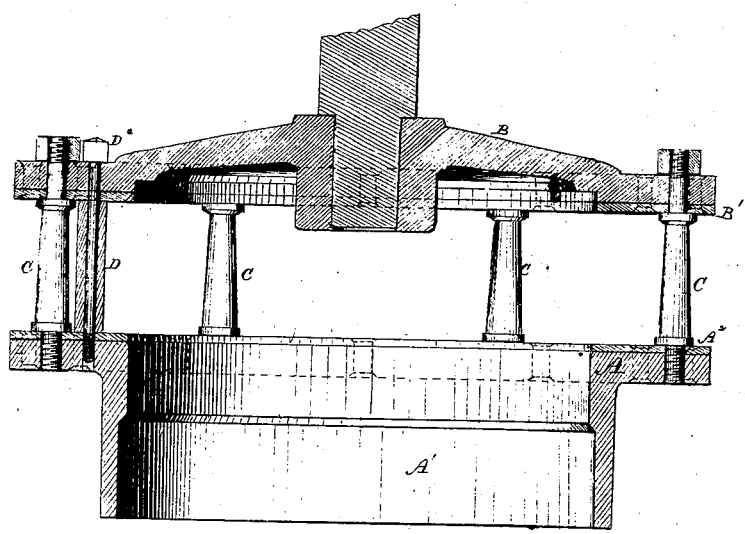
Figure 2 is a vertical sectional elevation, also showing my improvement.

From the inner edge of the facing, wing, or plate the head may be chambered or recessed, as shown in fig. 2, and thus be prepared for the hub, through which the shaft of the wheel passes.

C C refer to the ends or posts of metal which are to be screwed or otherwise secured to the lower head, from which they extend upward a distance equal to the width of the gates or chutes, where they are to be provided with shoulders or collars, upon which the upper head is to rest, their outer ends passing through such head, and receiving a nut which secures the whole firmly together.

D refers to a gate or chute, of which there are to be enough to extend entirely around the case. This gate or chute I prefer to make of brass or of non-corrosive metal, but it may be made of iron and perform well when the surfaces with which it comes in contact are properly faced.

$D^1$ refers to a screw, bolt, or pin, which is to be attached to the upper edge of the gate or chute D, and move in a slot in the upper head, for the purpose of controlling the movements of such gate.

$D^2$ refers to a bolt or rod, which passes through the gate or chute which turns thereon. This bolt passes through the upper head of the case and enters the lower head, to which it may be secured by a screw.

It will be seen that as a consequence of this method of constructing water-wheel cases, those portions of their surfaces which come in contact with the movable gates or chutes, and which it is important to keep perfectly smooth in order that a tight joint may be maintained between such surfaces and the ends of the gates, are of non-corrosive material, and that, as a consequence, when such joints are properly formed, they are not liable to be destroyed by the action of water thereon.

Having thus described my invention,

What I claim, and desire to secure by Letters Patent, is—

A water-wheel case, the surfaces of which coming in contact with the ends of the gates or chutes, are faced with brass, copper, or other non-corrosive material, substantially as and for the purpose set forth.

In testimony whereof, I have signed my name to this specification, in the presence of two subscribing witnesses.

JOHN W. BOOKWALTER.

Witnesses:
WM. H. SCOTT,
F. M. BOOKWALTER.